(12) United States Patent
Dichtl et al.

(10) Patent No.: US 9,641,515 B2
(45) Date of Patent: May 2, 2017

(54) RFID TAG AND METHOD FOR OPERATING AN RFID TAG

(71) Applicant: SIEMENS AKTIENGESELLSCHAFT, München (DE)

(72) Inventors: Markus Dichtl, München (DE); Erwin Hess, Ottobrunn (DE); Bernd Meyer, München (DE)

(73) Assignee: Siemens Aktiengesellschaft, München (DE)

( * ) Notice: Subject to any disclaimer, the term of this patent is extended or adjusted under 35 U.S.C. 154(b) by 57 days.

(21) Appl. No.: 14/758,950

(22) PCT Filed: Oct. 23, 2013

(86) PCT No.: PCT/EP2013/072191
§ 371 (c)(1),
(2) Date: Jul. 1, 2015

(87) PCT Pub. No.: WO2014/106546
PCT Pub. Date: Jul. 10, 2014

(65) Prior Publication Data
US 2015/0341343 A1 Nov. 26, 2015

(30) Foreign Application Priority Data
Jan. 2, 2013 (DE) .................. 10 2013 200 017

(51) Int. Cl.
*H04L 29/06* (2006.01)
*G06F 17/30* (2006.01)
(Continued)

(52) U.S. Cl.
CPC .... *H04L 63/0823* (2013.01); *G06F 17/30879* (2013.01); *G06F 21/445* (2013.01); *G06K 19/07318* (2013.01); *H04L 9/30* (2013.01)

(58) Field of Classification Search
CPC . H04L 63/0823; H04L 9/30; G06F 17/30879; G06F 21/445; G06F 19/07318
See application file for complete search history.

(56) References Cited

U.S. PATENT DOCUMENTS 8,458,472 B2 6/2013 Braun et al.
2006/0235805 A1* 10/2006 Peng .................. G06Q 30/06
705/76
(Continued)

FOREIGN PATENT DOCUMENTS

| CN | 1949250 A | 4/2007 |
|----|-----------|--------|
| CN | 102426655 A | 4/2012 |

(Continued)

OTHER PUBLICATIONS

Selwyn Piramuthu, "Protocol for RFID tag/reader authentication", Elsevier, Jan. 27, 2007, pp. 1-18.*
(Continued)

*Primary Examiner* — Chau Le
*Assistant Examiner* — Ghodrat Jamshidi
(74) *Attorney, Agent, or Firm* — Lempia Summerfield Katz LLC

(57) ABSTRACT

The invention relates to an RFID tag, which comprises a receiving means, a first and a second verification means, and a transmitting means. The receiving means is designed to receive a challenge message sent by an RFID reading device. Said challenge message comprises a challenge data set, which has a digital certificate issued for the RFID reading device by a certification authority and signed by means of a private key of the certification authority and which has a request message, and a digital signature at least of the request message, which digital signature is generated by means of a private key of the RFID reading device. The first verification means is designed to verify the digital certificate by means of a public key of the certification (Continued)

authority. The second verification means is designed to verify the digital signature by means of a public key of the RFID reading device. The transmitting means transmits a response message to the REID reading device if the certificate and the digital signature are verified. By verifying the challenge message, the RFID tag can ensure that the RFID tag transmits a response message only to such a requesting REID reading device that is actually authorized to communicate with said RFID tag.

18 Claims, 3 Drawing Sheets

(51) Int. Cl.
    *G06K 19/073*     (2006.01)
    *H04L 9/30*     (2006.01)
    *G06F 21/44*     (2013.01)

(56) References Cited

U.S. PATENT DOCUMENTS

2009/0235073 A1   9/2009   Braun et al.
2009/0315673 A1   12/2009   Huang
2011/0291803 A1*   12/2011   Bajic ................ G08B 13/2462
                                                             340/10.1

FOREIGN PATENT DOCUMENTS

DE     102006060760 A1   4/2008
WO     WO2011149765 A2   12/2011

OTHER PUBLICATIONS

German Office Action for German Application No. 10 2013 200 017.0, mailed Sep. 6, 2013, with English Translation.

PCT International Search Report and Written Opinion of the International Searching Authority dated Mar. 3, 2014 for corresponding PCT/EP2013/072191.

Chinese Office Action for related Chinese Application No. 201380069186.X dated Dec. 22, 2016.

* cited by examiner

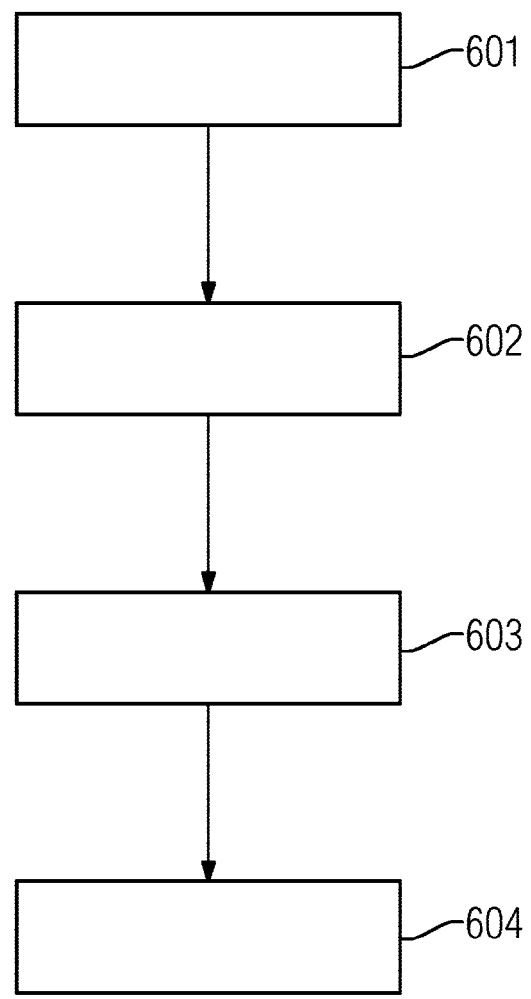

RFID TAG AND METHOD FOR OPERATING AN RFID TAG

This application is the National Stage of International Application No. PCT/EP2013/072191, filed Oct. 23, 2013, which claims the benefit of German Patent Application No. DE 10 2013 200 017.0, filed Jan. 2, 2013. The entire contents of these documents are hereby incorporated herein by reference.

BACKGROUND

The present embodiments relate to an RFID tag.

Radio Frequency Identification (RFID) is a technology with which a unique identification number (ID) may be allocated to products or physical objects, such as, for example, identification documents, components, spare parts, containers, packaging or transport containers, and may be read out with radio technology.

In a number of technical applications, different entities (e.g., devices, computers, persons) conventionally communicate with one another, exchange data, or instigate actions. A one-way or two-way authentication of the entities involved often takes place at the start of a communication of this type. This normally takes place via a challenge-and-response protocol.

The sequence of a protocol of this type is shown below using the example of a simple, one-way authentication. Here, the entity B attempts to authenticate itself to the entity A. For this purpose, the entities A and B possess the following information and methods.

The entity B has information K(B) and a method AUTH for generating the authentication information contained in the response. The entity A has a sufficient amount of information K'(B) on K(B) and a suitable method PRÜF with which the entity A may ascertain whether the entity B is actually in possession of K(B).

The sequence of authentication of the entity B by the entity A may then run as follows: 1) The entity A transmits a prompt (e.g., challenge) for authentication to the entity B; 2) The entity B answers with a response or response message (e.g., answer), into which K(B) is incorporated in a suitable manner using the method AUTH; and 3) The entity A checks with the method PRUF and the information K'(B) whether the entity B is actually in possession of K(B).

In the simplest form of an authentication method of this type, the authentication information K(B) is a password (PIN), and AUTH is the output routine responding to the challenge. The challenge is invariable and consists of the prompt to enter the password. K'(B) is similarly the password (e.g., in encrypted form).

In more complex methods offering a higher level of security, K(B) and K'(B) are cryptographic keys, AUTH and PRÜF are based on cryptographic algorithms (e.g., symmetric or asymmetric), and the challenge is frequently a random number and is included in the calculation of the response.

In the case of two-way authentication, two protocols of this type normally run, wherein the entities A and B exchange roles in the second authentication.

It is a prerequisite for all these forms of authentication methods that the technical facility for communication between A and B is to exist (e.g., in that a chip card is inserted into a reading device or an RFID tag is located in the field of a reading device).

A common feature of all these authentication methods is that the readiness for communication, at the least for the purpose of the authentication method, is implicitly required in both communication partners A and B. In the case of the authentication of a contact-based chip card, this readiness for communication is actually associated with a deliberate action (e.g., the insertion of the card into a reading device). The readiness of the reading device for communication is normally provided automatically. However, a different situation exists in the case of contactless chip cards and RFID tags, both active and passive. The readiness for communication is, for example, directly associated with the relevant technical facility.

In practice, this readiness to start communication between the entity A to be checked (e.g., reading device) and the entity B (RFID) authenticating itself is linked by the following automatically running procedure directly to the technical facility for communication. The reading device emits pulses at short intervals and in a broadcast-like method and in this way, repeatedly builds up an energy field around itself. RFID tags that are located in this field or enter this field are activated and transmit to the reading device initial information (ID, type, and the like) on their own entity, to which the reading device then attunes itself for further communication.

The actual communication between the reading device and the RFID tag then starts (e.g., following the interposition of a further protocol for collision handling). A one way or two-way authentication may take place at the start. In the method sequence described, the entity B (the RFID tag) essentially cannot prevent the presence of entity B in the vicinity of entity A from being known to the entity A (e.g., the reading device). However, there are situations in which this information already has harmful effects, even if the subsequent authentication method is unsuccessfully aborted. This situation arises, for example, if the entity B does not wish to disclose its own presence at a specific location to unauthorized parties. The motivation for this may, for example, be for reasons of data protection or privacy. However, there are, above all, authentication scenarios from the domain of national security and from military applications in which the automatic generation and transmission of a "first response" is already highly disadvantageous on the grounds of a preceding untargeted activation action alone.

SUMMARY AND DESCRIPTION

The scope of the present invention is defined solely by the appended claims and is not affected to any degree by the statements within this summary.

The underlying technical problem in the prior art is that the originally used protocols for communication between a mobile, wirelessly communicating entity B (e.g., a contactless chip card, an active or passive RFID tag) and a matching RFID reading device provide an automatic link between the creation of the technical facility to start communication and the actual start of the information flow from the entity B to the entity A.

The present embodiments may obviate one or more of the drawbacks or limitations in the related art. For example, an improved RFID tag is provided.

An RFID tag for a product is provided. The RFID tag includes a receiver, a first verifier, a second verifier, and a transmitter. The receiver is configured to receive a challenge message transmitted by an RFID reading device. The challenge message includes a challenge data set with a digital certificate issued for the RFID reading device by a certification body and signed with a private key of the certification body. The challenge message also includes a request message and a digital signature, at least of the request message, generated by a private key of the RFID reading device. The first verifier is configured to verify the digital certificate using a public key of the certification body. The second verifier is configured to verify the digital signature at least of the request message using a public key of the RFID reading device. The transmitter is configured to transmit a response message to the RFID reading device if the certificate and the digital signature are verified.

Using the checking (e.g., verification) of the challenge message by the RFID tag, the RFID tag may provide that the RFID tag only transmits a response message to a requesting RFID reading device of the type that is actually authorized to communicate with this RFID tag. This authorization or legitimation includes the verification of the digital certificate issued by the certification body for the RFID reading device, and the verification of the digital signature at least of the request message of the RFID reading device.

The conventional automatism between the technical capability to establish contact between an RFID tag and an RFID reading device and the actual establishment of contact is thus conceptually broken. In one or more of the present embodiments, the challenge message may also be a legitimated challenge message, since the challenge message includes the digital certificate to be verified and the digital signature to be verified. The requesting RFID reading device will therefore receive an answer (e.g., response, response message) from the RFID tag only if the challenge message is actually legitimated for this purpose.

Within the meaning of the present embodiments, an RFID tag is a device that is suitable for Radio Frequency Identification (RFID). For example, the RFID tag is suitable for identification using electromagnetic waves. The RFID tag may also be referred to as an RFID label, RFID device, or RFID transponder. The challenge message may also be referred to as a challenge, prompt or request. The challenge data set may be referred to as a data set of the challenge message. The response message may also be referred to as a response or answer. The digital signature is formed at least via the request message. The digital signature may also be formed via the request message and the digital certificate. The request message is generated by the RFID reading device and is a sufficiently long, variable, non-recurring value that may also contain the current time as a component. Further components may be a random number, a counter value, or a combination hereof. If the current time is a component of the request message, the RFID tag may check this also. For this purpose, the RFID tag may then be equipped with a timer (e.g., a clock) so that the RFID itself may define the current time as a reference value.

The RFID reading device is a device that may transmit and receive messages using RFID.

In one embodiment, the transmitter is configured to transmit the response message to the RFID reading device only if the certificate and the digital signature are verified.

The RFID tag transmits a message only if it is provided that the RFID reading device is actually legitimated to communicate with the RFID tag. Otherwise, the RFID tag transmits no messages and is therefore not locatable for the requesting RFID reading device.

In a further embodiment, a certificate data set contained in the certificate includes at least an identification number of the RFID reading device and authorization information indicating a temporally and/or geographically limited authorization of the RFID reading device to communicate with RFID tags. The RFID tag is equipped with a checking device that is configured to check the authorization information contained in the certificate data set. The certificate data set may also be referred to as the data set of the certificate.

In a further embodiment, the transmitter is configured to transmit the response message to the RFID reading device only if the certificate and the digital signature are verified, and the check of the authorization information contained in the certificate data set is positive.

In this embodiment, the authorization information includes location information indicating the geographical area in which the RFID reading device is authorized to communicate with RFID tags, and time information indicating a time period in which the RFID device is authorized to communicate with RFID tags.

The checking device may, for example, be equipped with a first checking unit and a second checking unit. The first checking unit is configured to provide a first check result by comparing the location information contained in the certificate data set with current location information defined by the RFID tag. The second checking unit is configured to provide a second check result by comparing the time information contained in the certificate data set and/or in the request message with a current time defined by the RFID tag.

In the above embodiments, the legitimation of the RFID reading device is extended by a temporal and/or geographical authorization. The geographical authorization is, for example, formed by the location information that is part of the challenge message. The temporal authorization is formed, for example, by the time information that is similarly part of the challenge message. The RFID tag may thus advantageously check whether the RFID reading device is temporally and/or geographically authorized to access the RFID tag. If the result is negative, the RFID tag will make no contact with the RFID reading device.

In a further embodiment, the transmitter is configured to transmit the response message to the RFID reading device only if the certificate and the digital signature are verified, the first check result is positive, and the second check result is positive.

The RFID tag transmits a message to the RFID reading device only if all checks have a positive result. If one of the positive results is missing (e.g., the geographical authorization), the RFID tag transmits no message to the requesting RFID reading device.

In a further embodiment, the certificate data set also includes the public key of the RFID reading device.

The public key of the RFID reading device is advantageously already part of the certificate data set and does not therefore need to be provided in another way to the RFID tag.

In a further embodiment, a storage device is provided to store the public key of the RFID reading device provided by the certification body.

In this embodiment, it is not necessary for the certificate data set actually to include the public key of the RFID reading device. The public key of the RFID reading device may also be provided to the RFID tag in a different way (e.g., through storage in the storage device before delivery of the RFID reading device).

In a further embodiment, the challenge message includes the challenge data set, a hash value formed by the challenge data set, and the digital signature that is generated depending on the hash value and the private key of the RFID reading device.

The necessary data volume to be transmitted is advantageously minimized through the use of the hash values.

In a further embodiment, the RFID tag is formed as an active RFID tag.

In a further embodiment, the RFID tag is formed as a passive RFID tag.

In one or more of the present embodiments, a product that includes an RFID tag, as described above, is provided. The product is, for example, a container or packaging to which the RFID tag is fitted.

In one or more of the present embodiments, a system (e.g., an arrangement) that includes a number N of RFID reading devices and a plurality M of RFID tags, as described above (e.g., N≥1, M≥2), is provided.

The system may include a certification body for issuing a digital certificate for the respective RFID reading device from the number of RFID reading devices.

In one or more of the present embodiments, a method for operating an RFID tag for a product is provided. The method includes receiving a challenge message transmitted by an RFID reading device. The challenge message includes a challenge data set with a digital certificate issued for the RFID reading device by a certification body and signed with a private key of the certification body. The challenge message also includes a request message and a digital signature, at least of the request message, generated by a private key of the RFID reading device. The digital certificate is verified by a public key of the certification body. The digital signature at least of the request message is verified by a public key of the RFID reading device. A response message is transmitted to the RFID reading device if the certificate and the digital signature are verified.

In one or more of the present embodiments, a computer program product (e.g., a non-transitory computer-readable storage medium) that initiates the performance of the method, as explained above, on a program-controlled device is provided.

A computer program product such as a computer program device may be provided or supplied, for example, as a storage medium, such as a memory card, USB stick, CD-ROM, DVD or in the form of a downloadable file from a server in a network. This may take place, for example, in a wireless communication network through the transmission of a corresponding file with the computer program product or the computer program device.

Moreover, a data medium is proposed with a stored computer program with commands which initiate the performance of the method explained above on a program-controlled device.

BRIEF DESCRIPTION OF THE DRAWINGS

FIG. 6 shows a flow diagram of an embodiment of a method for operating an RFID tag.

DETAILED DESCRIPTION

In the figures, same or functionally same elements are denoted with the same reference symbols, unless otherwise indicated.

Figure 1:
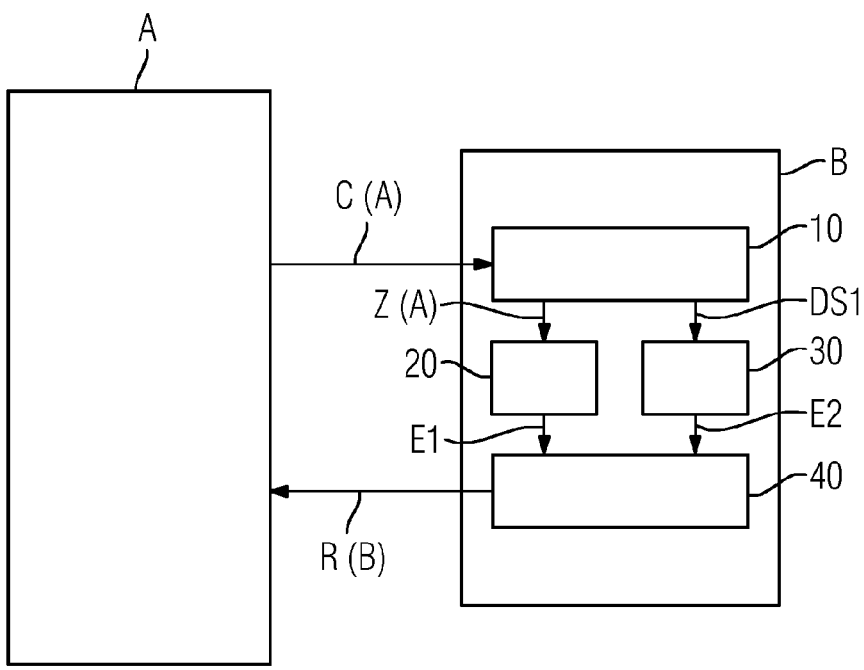
FIG. 1 shows a schematic block diagram of a first embodiment of an RFID tag.

FIG. 1 shows a schematic block diagram of a first embodiment of an RFID tag B for a product such as, for example, a packaging or container. The RFID tag B is, for example, a passive RFID tag B, and the product is a container or a packaging.

The RFID tag B includes an RFID chip for processing data and an antenna (not shown) for transmitting the data (e.g., to an RFID receiver). The RFID chip may include the units 10-40 of the RFID tag B explained below.

The RFID tag B includes a receiver 10, a first verifier 20, a second verification verifier 30 and a transmitter 40.

Figure 2:
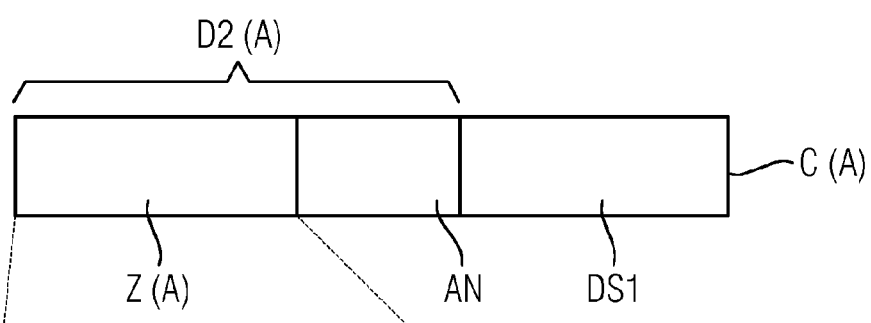
FIG. 2 shows a schematic block diagram of an embodiment of a challenge message transmitted by an RFID reading device.

The receiver 10 is configured to receive a challenge message C(A) transmitted by an RFID reading device A. The challenge message C(A) is suitable for prompting the RFID tag B to transmit an answer (e.g., a response message R(B)). The challenge message C(A) is shown by way of an example in FIG. 2 and includes a challenge data set D2(A) with a digital certificate Z(A) issued for the RFID reading device A by a certification body CA (see FIGS. 4 and 5) and signed with a private key K1(CA) of the certification body CA, and a request message AN. The request message AN includes the conventional prompt of the RFID reading device A to transmit an answer (e.g., response message R(B)). The challenge message C(A) also includes a digital signature DS1, at least of the request message, generated by a private key K1(A) of the RFID reading device A.

The first verifier 20 receives the digital certificate Z(A) and verifies this received digital certificate Z(A) by means of a public key K2(CA) of the certification body CA. The second verifier 30, on the other hand, receives the digital signature DS1 at least of the request message of the RFID reading device A and verifies this by means of a public key K2(A) of the RFID reading device A.

The first verifier 20 provides a first result E1 on the output side, depending on the verification of the digital certificate ZA. Accordingly, the second verifier 30 provides a second result E2 on the output side, depending on the verification of the digital signature DS1 at least of the request message. The transmitter 40 transmits a response message R(B) to the RFID reading device A, if the certificate Z(A) and the digital signature DS1 are verified. In other words, both events E1 and E2 are to be positive so that the transmitter 40 dispatches the response message R(B) to the RFID reading device A.

Figure 3:
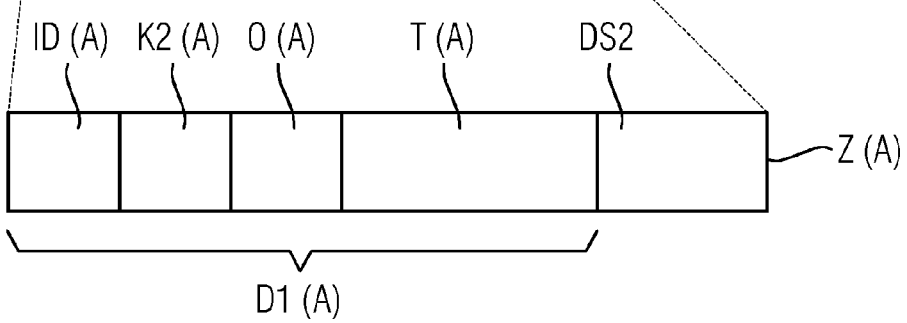
FIG. 3 shows a schematic block diagram of an embodiment of a digital certificate issued by a certification body and signed with a private key of the certification body.

An example of the digital certificate Z(A) issued by the certification body CA and signed with the private key K1(CA) of the certification body CA is shown in FIG. 3. The certificate Z(A) issued for the reading device A includes a certificate data set D1(A) and a digital signature DS2 of the certificate Z(A). The certificate data set D1(A) includes an identification number ID(A) of the RFID reading device A, location information O(A) to indicate the geographical area in which the RFID reading device A is authorized to communicate with RFID tags B, and time information T(A) to indicate a time period in which the RFID reading device A is authorized to communicate with RFID tags B.

Figure 4:
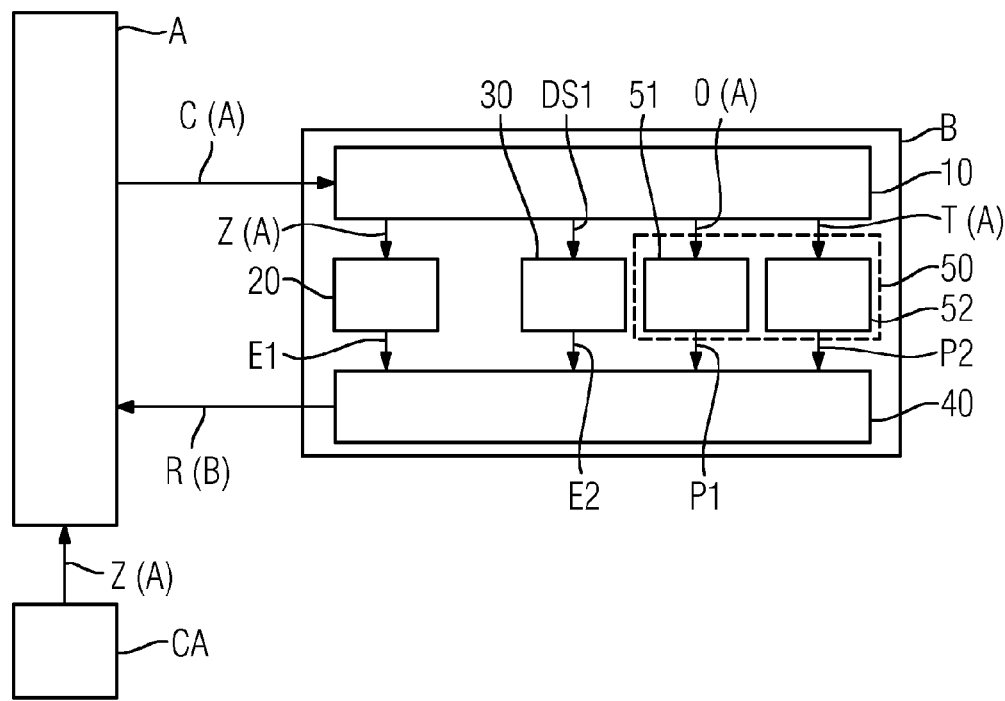
FIG. 4 shows a schematic block diagram of a second embodiment of an RFID tag.
Figure 5:
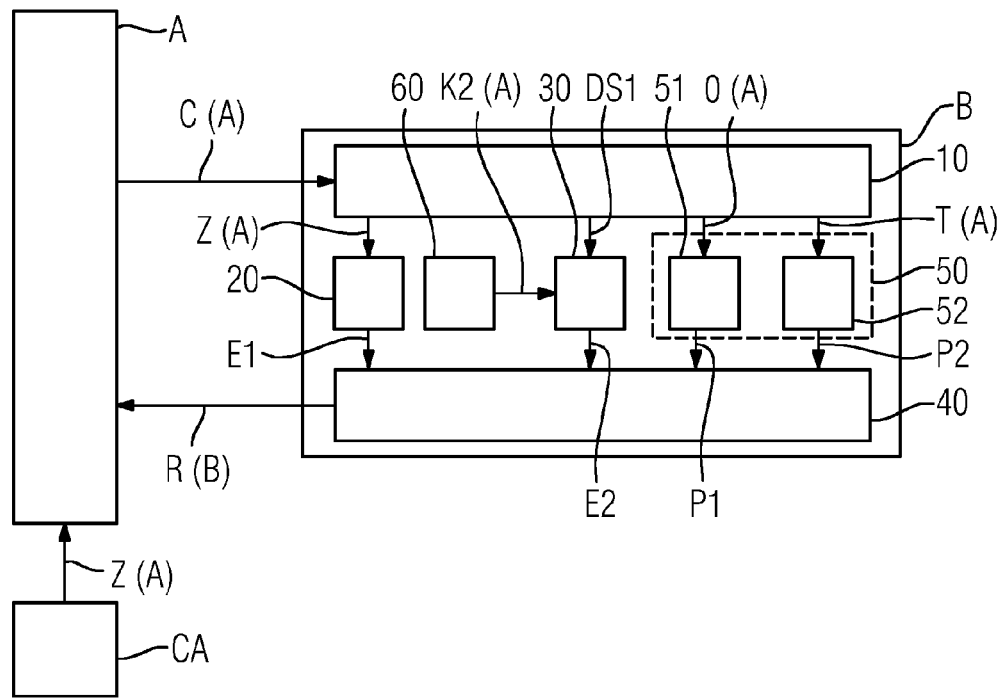
FIG. 5 shows a schematic block diagram of a third embodiment of an RFID tag.

The certificate data set D1(A) of FIG. 3 includes the public key K2(A) of the RFID reading device A. Examples relating to the use of the location information O(A) and the time information T(A) of the certificate Z(A) are shown in FIGS. 4 and 5. FIG. 4 shows a schematic block diagram of a second embodiment of an RFID tag B, whereas FIG. 5 shows a third embodiment of an RFID tag B of this type. Along with the RFID tag B, the RFID reading device A and the certification body CA are also shown in FIGS. 4 and 5.

The second embodiment of the RFID tag B of FIG. 4 differs from the first example embodiment of the RFID tag B of FIG. 1 in that the RFID tag B of FIG. 4 also includes a checking device 50. The checking device 50 includes a first checking unit 51 and a second checking unit 52. The first checking unit 51 is configured to provide a first check result P1 by comparing the location information contained in the certificate data set D1(A) with current location information defined by the RFID tag B. Similarly, the second checking units 52 is configured to provide a second check result P2 by comparing the time information T(A) included in the certificate data set D1(A) with a current time defined by the RFID tag B.

In the second embodiment of FIG. 4, the transmitter 40 is then configured to transmit the response message R(B) to the RFID reading device A only if the certificate Z(A) and the digital signature DS1 are verified, the first check result P1 is positive, and the second check result P2 is positive. In other words, the transmitter 40 transmits the response message R(B) only if E1, E2, P1 and P2 are positive.

The third embodiment of the RFID tag B of FIG. 5 is based on the second embodiment of the RFID tag B of FIG. 4 and also includes a storage device 60. The storage device 60 is configured to store the public key K2(A) of the RFID reading device A provided by the certification body CA. This third embodiment shows that the public key K2(A) of the RFID reading device does not necessarily have to be part of the certificate data set D1(A) and therefore of the challenge message C(A).

FIG. 6 shows a flow diagram of an embodiment of a method for operating an RFID tag for a product.

In act 601, a challenge message transmitted by an RFID reading device is received. The challenge message includes a challenge data set with a digital certificate issued for the RFID reading device by a certification body and signed with a private key of the certification body. The challenge data set also includes a request message and a digital signature, at least of the request message, generated by a private key of the RFID reading device In act 602, the digital certificate is verified by a public key of the certification body.

In act 603, the digital signature at least of the request message is verified by a public key of the RFID reading device.

In act 604, a response message is transmitted to the RFID reading device if the certificate and the digital signature are verified.

Although the invention has been illustrated and described in detail through the exemplary embodiments, the invention is not limited by the disclosed examples. Other variations may be derived therefrom by the person skilled in the art without exceeding the protective scope of the invention.

The elements and features recited in the appended claims may be combined in different ways to produce new claims that likewise fall within the scope of the present invention. Thus, whereas the dependent claims appended below depend from only a single independent or dependent claim, these dependent claims may, alternatively, be made to depend, in the alternative, from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An RFID tag for a product, the RFID tag comprising:
a receiver configured to receive a challenge message transmitted by an RFID reading device, the challenge message comprising a challenge data set, the challenge data set comprising a digital certificate issued for the RFID reading device by a certification body and signed with a private key of the certification body, the challenge data set further comprising a request message and a digital signature, at least of the request message, generated by a private key of the RFID reading device;
a first verification device configured to verify the digital certificate using a public key of the certification body;
a second verification device configured to verify the digital signature at least of the request message using a public key of the RFID reading device; and
a transmitter configured to transmit a response message to the RFID reading device when the digital certificate and the digital signature are verified.

2. The RFID tag of claim 1, wherein the transmitter is configured to transmit the response message to the RFID reading device only when the certificate and the digital signature are verified.

3. The RFID tag of claim 1, wherein a certificate data set included in the digital certificate comprises at least an identification number of the RFID reading device and authorization information to indicate a temporally, geographically, or temporally and geographically limited authorization of the RFID reading device to communicate with RFID tags, and
wherein the RFID tag further comprises a checking device configured to check the authorization information contained in the certificate data set.

4. The RFID tag of claim 3, wherein the transmitter is configured to transmit the response message to the RFID reading device only when the certificate and the digital signature are verified and the check of the authorization information contained in the certificate data set is positive.

5. The RFID tag of claim 3, wherein the authorization information comprises location information indicating a geographical area in which the RFID reading device is authorized to communicate with RFID tags, and time information indicating a time period in which the RFID reading device is authorized to communicate with RFID tags.

6. The RFID tag of claim 5, wherein the checking device includes a first checking unit and a second checking unit,
wherein the first checking unit is configured to provide a first check result by comparing the location information contained in the certificate data set with current location information defined by the RFID tag, and
wherein the second checking unit is configured to provide a second check result by comparing the time information contained in the certificate data set, in the request message, or in the certificate data set and in the request message with a current time defined by the RFID tag (B).

7. The RFID tag of claim 6, wherein the transmitter is configured to transmit the response message to the RFID reading device only when the certificate and the digital signature are verified, the first check result is positive, and the second check result is positive.

8. The RFID tag of claim 3, wherein the certificate data set comprises the public key of the RFID reading device.

9. The RFID tag of claim 1, further comprising a storage device configured to store the public key of the RFID reading device provided by the certification body.

10. The RFID tag of claim 1, wherein the challenge message comprises the challenge data set, a hash value formed by the challenge data set, and the digital signature that is generated depending on the hash value and the private key of the RFID reading device.

11. The RFID tag of claim 1, wherein a certificate data set included in the digital certificate comprises at least an identification number of the RFID reading device and authorization information to indicate a temporally, geographically, or temporally and geographically limited authorization of the RFID reading device to communicate with RFID tags, and
wherein the RFID tag further comprises a checking device configured to check the authorization information contained in the certificate data set.

12. The RFID tag of claim 11, wherein the transmitter is configured to transmit the response message to the RFID reading device only when the certificate and the digital signature are verified and the check of the authorization information contained in the certificate data set is positive.

13. A system comprising:
a plurality of RFID reading devices and a plurality of RFID tags, wherein an RFID tag of the plurality of RFID tags is for a product and comprises:
a receiver configured to receive a challenge message transmitted by an RFID reading device, the challenge message comprising a challenge data set, the challenge data set comprising a digital certificate issued for the RFID reading device by a certification body and signed with a private key of the certification body, the challenge data set further comprising a request message and a digital signature, at least of the request message, generated by a private key of the RFID reading device;
a first verification device configured to verify the digital certificate using a public key of the certification body;
a second verification device configured to verify the digital signature at least of the request message using a public key of the RFID reading device; and
a transmitter configured to transmit a response message to the RFID reading device when the digital certificate and the digital signature are verified.

14. The system of claim 13, wherein a certification body is provided to issue a digital certificate for a respective RFID reading device from the plurality of RFID reading devices.

15. The system of claim 13, wherein the transmitter is configured to transmit the response message to the RFID reading device only when the certificate and the digital signature are verified.

16. A product comprising:
an RFID tag comprising:
a receiver configured to receive a challenge message transmitted by an RFID reading device, the challenge message comprising a challenge data set, the challenge data set comprising a digital certificate issued for the RFID reading device by a certification body and signed with a private key of the certification body, the challenge data set further comprising a request message and a digital signature, at least of the request message, generated by a private key of the RFID reading device;
a first verification device configured to verify the digital certificate using a public key of the certification body;
a second verification device configured to verify the digital signature at least of the request message using a public key of the RFID reading device; and
a transmitter configured to transmit a response message to the RFID reading device when the digital certificate and the digital signature are verified.

17. A method for operating an RFID tag for a product, the method comprising:
receiving a challenge message transmitted by an RFID reading device, the challenge message comprising a challenge data set, the challenge data set comprising a digital certificate issued for the RFID reading device by a certification body and signed with a private key of the certification body, the challenge data set further comprising a request message and a digital signature, at least of the request message, generated by a private key of the RFID reading device;
verifying the digital certificate using a public key of the certification body;
verifying the digital signature at least of the request message using a public key of the RFID reading device; and
transmitting a response message to the RFID reading device when the digital certificate and the digital signature are verified.

18. In a non-transitory computer-readable storage medium that stores instructions executable by a program-controlled device to operate an RFID tag for a product, the instructions comprising:
receiving a challenge message transmitted by an RFID reading device, the challenge message comprising a challenge data set, the challenge data set comprising a digital certificate issued for the RFID reading device by a certification body and signed with a private key of the certification body, the challenge data set further comprising a request message and a digital signature, at least of the request message, generated by a private key of the RFID reading device;
verifying the digital certificate using a public key of the certification body;
verifying the digital signature at least of the request message using a public key of the RFID reading device; and
transmitting a response message to the RFID reading device when the digital certificate and the digital signature are verified.

* * * * *